United States Patent Office 3,350,353
Patented Oct. 31, 1967

3,350,353
EPOXIDE RESIN PROCESS
Francis B. Alvey, Louisville, Ky., assignor to Celanese Coatings Company, a corporation of Delaware
No Drawing. Filed Mar. 25, 1965, Ser. No. 442,820
9 Claims. (Cl. 260—47)

This invention relates to a process for preparing epoxide resin compositions. By the process of this invention, lower molecular weight epoxide resins are reacted with dihydric phenols producing higher molecular weight epoxide resins which have excellent color and clarity, good thermal stability and excellent reactivity with curing agents.

When a phenolic group is reacted with an epoxide group, a phenolic ether is formed and an aliphatic hydroxyl group is generated:

(1)
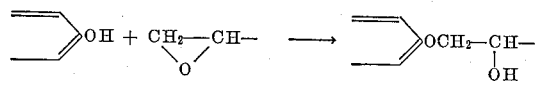

As the reaction progresses, an epoxide group can react with the generated aliphatic hydroxyl:

(2)
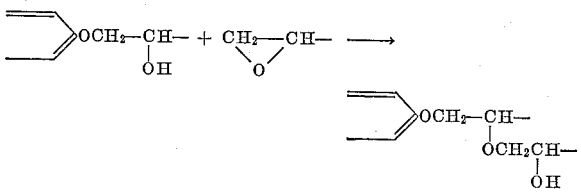

In the uncatalyzed reaction of a phenol and an epoxide at elevated temperatures, reaction (1) and reaction (2) both take place to a considerable extent. If the reactants, phenol and epoxide, are difunctional, reaction (2) will lead to branched polymer formation and eventual gelation. In the formation of higher molecular weight epoxide resins from the reaction of a lower molecular weight epoxide resin and a dihydric phenol, gelation is undesirable.

When the phenol-epoxide reaction is base catalyzed, reaction (1) goes substantially to completion with only a small amount of reaction (2) occurring. However, if the epoxide groups are in excess over the phenolic groups, reaction (2) will continue after all the phenolic groups have been used up in reaction (1). Again, if the reactants are difunctional, branched and eventually gelled polymers are formed.

It has now been found that under certain conditions primary, secondary and tertiary amines will selectively catalyze the reaction of epoxide groups, in excess, with phenolic groups, with substantially none of reaction (2) taking place either during the initial reaction or after the phenol groups have reacted. The conditions for this catalytic selectivity are based upon the type of amine, the concentration of the particular amine being used, and the temperature at which the reaction is being conducted.

In accordance then with an embodiment of this invention, heat stable, higher molecular weight, higher melting 1,2 epoxide resins are prepared by reacting a first 1,2 epoxide resin with a dihydric phenol at a temperature of 50° C. to 150° C. in admixture with an amine catalyst, represented by the formula:

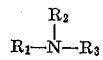

$R_1$ and $R_2$ are defined as being hydrogen, a hydrocarbon group containing 1 to 22 carbon atoms, having a methylene group adjacent to the nitrogen atom, and being free from groups reactive with epoxide groups, or a hydrocarbon group containing 2 to 10 carbon atoms, having an ethylene group adjacent to the nitrogen atom, said ethylene group being substituted with a hydroxyl group on the carbon atom beta to the nitrogen atom, and said hydrocarbon group being free from other groups reactive with epoxide groups, and wherein $R_3$ is a hydrocarbon group containing 1 to 22 carbon atoms, having a methylene group adjacent to the nitrogen atom, and being free from groups reactive with epoxide groups, or a hydrocarbon group containing 2 to 10 carbon atoms, having an ethylene group adjacent to the nitrogen atom, said ethylene group being substituted with a hydroxyl group on the carbon atom beta to the nitrogen atom, and said hydrocarbon group being free from other groups reactive with epoxide groups. $R_1$, $R_2$ and $R_3$ can be the same or different.

The ratio of amine catalyst to each epoxide equivalent of the first epoxide resin is about 0.001 to about 0.05 mol of amine having at least two substituents on the nitrogen atom which are hydrogen, a hydrocarbon substituent having a hydroxyl group on the carbon atom beta to the nitrogen atom, or mixtures of these and about 0.0001 to about 0.005 mol of amine having no or only one substituent on the nitrogen atom which is hydrogen or a hydrocarbon substituent having a hydroxyl group on the carbon atom beta to the nitrogen atom.

A second 1,2 epoxide resin is formed wherein the molecular weight of the second epoxide resin is increased by a factor of about 0.4 to about 15 over the molecular weight of the first epoxide resin.

The epoxide resins contemplated for use in this invention are any low molecular weight diepoxide resins, such resins being defined as having more than one but no more than two 1,2 epoxy groups per molecule. They can be aromatic, aliphatic, cycloaliphatic, saturated or unsaturated and monomeric or polymeric in nature. Such epoxide resins are epoxidized diolefins, for example, butadiene dioxide, hexadiene dioxide, vinyl cyclohexene dioxide and dipentene dioxide, and glycidyl esters of dicarboxylic acids, the acids including adipic acid, azelaic acid, sebacic acid, dimer acids of unsaturated fatty acids, phthalic acid, isophthalic acid, terephthalic acid and hexahydrophthalic acid.

Additional epoxide resins are glycidyl ethers of aliphatic dihydric alcohols, the dihydric alcohols being ethylene glycol, propylene glycol, hexylene glycol, diethylene glycol, dipropylene glycol, polyethylene glycols, polypropylene glycols, polybutylene glycols, dihydroxyalkyl ethers of dihydric phenols and the like.

Particularly preferred epoxide resins are polyglycidyl ethers of dihydric phenols, which are the reaction products of an epihalohydrin and a dihydric phenol. Low molecular weight polyglycidyl ethers are prepared by reacting a dihydric phenol with an epihalohydrin in an excess of epihalohydrin using an alkali as the condensation and dehydrohalogenation agent, the ratio of reactants being 1 mol of dihydric phenol to from 2 to about 10 mols of epihalohydrin and about 2 equivalents of alkali. Somewhat higher molecular weight polyglycidyl ethers are made using less than 2 mols of epihalohydrin (1.2 to 2 mols) to 1 mol of dihydric phenol with the alkali used being approximately equivalent to the epihalohydrin employed. These polyglycidyl ethers of dihydric phenols contain more than one to about two 1,2 epoxide groups per molecule.

Polyglycidyl ethers of dihydric phenols having a wide range of molecular weights and melting points can be used in this invention. The molecular weights can be as low as 222 and as high as about 2000 with melting points below room temperature up to about 125° C. However, the preferred polyglycidyl ethers have molecular weights in the range of about 340 to about 1000 and melting points from about 0° C. to about 75° C.

The dihydric phenols from which the polyglycidyl ethers are derived are those dihydric phenols which contain two phenolic hydroxyl groups and are free from other groups which are normally reactive with epoxide groups. Examples of such reactive groups are amine groups and carboxylic acid groups. Useful dihydric phenols include p,p'-dihydroxydiphenyl propane, commonly known as bisphenol A, resorcinol, 1,4-dihydroxynaphthalene, p,p'-dihydroxydiphenyl methane, dihydroxy diphenyl, dihydroxydiphenyl sulfone, and chlorinated and brominated derivatives such as tetrabromo- and tetrachloro- bisphenol A.

The dihydric phenols that are reacted by the process of this invention with lower molecular weight epoxide resins include the dihydric phenols listed above, from which the polyglycidyl ethers of dihydric phenols are derived. By utilizing various combinations of epoxide resins and dihydric phenols, higher molecular weight epoxide resins having a wide range of physical and chemical properties can be produced.

Amines which are useful as catalysts in the process of this invention are primary amines, examples of which include methylamine, ethylamine, isopropylamine, butylamine, 2-ethylhexylamine, benzylamine, phenylethylamine, and fatty amines which contain from about 10 to about 22 carbon atoms in their hydrocarbon chains. Examples of useful fatty amines are decylamine, dodecylamine, octadecylamine, oleylamine, linoleylamine, and stearylamine. Mixtures of fatty amines are also contemplated for use in this invention, the names of such mixtures being derived from the fatty acids from which the amines are made. Such mixtures include tallow amine, soya amine and coconut amine. Particularly useful primary amines are the alkanol amines such as ethanol amine, isopropanol amine, 1-amino, 2-butanol, 2-amino, 3-hexanol, and the like.

Secondary amines are also useful catalysts in this invention, such as dimethylamine, diethylamine, N-methyl ethylamine, diisopropylamine, dibutylamine, N-methylbenzylamine, N-methylphenylethylamine, dodecylamine, N-methylethanolamine, N-ethylethanolamine, diethanolamine, diisopropanolamine, di($\beta$-hydroxybutyl) amine, etc.

Tertiary amines that can be used in this invention are trimethylamine, triethylamine, tributylamine, benzyldimethylamine, N,N-dimethylethanolamine, N,N - diethylethanolamine, N,N-diisopropylethanolamine, N-methyldiethanolamine, N-ethyl diisopropanolamine, N-butyldiethanolamine, N-butyl, di(2-hydroxy,3-phenoxypropyl)-amine, triethanolamine, triisopropanolamine, tri($\beta$-hydroxybutyl) amine, tri($\beta$-hydroxyhexyl) amine, and the like.

As has been stated hereinbefore, the catalytic amount of amine will depend upon the type of amine used. The types of amines can be divided into two classes, one class being hindered or potentially hindered amines, the other class being unhindered amines. Hindered amines are secondary amines which contain two hydrocarbon substituents having hydroxyl groups on the carbon atom beta to the nitrogen atom and tertiary amines which contain two or three beta hydroxyl substituted hydrocarbon substitutents. The proximity of the hydroxyl groups to the nitrogen atom apparently decreases the effectiveness of the amine as a cross-linking catalyst, possibly due to steric effects or two hydrogen bonding.

Potentially hindered amines are primary amines which may or may not have a beta hydroxyl substituted hydrocarbon substituent and secondary amines which have one beta hydroxyl containing hydrocarbon substituent. Such primary and secondary amines as used in this invention react with the epoxide groups of the epoxide resin reactant. Tertiary amines are formed which contain at least two beta hydroxyl substituted hydrocarbon substituents.

The hindered and potentially hindered amine catalysts can be used in amounts from about 0.001 to about 0.05 mol per epoxide equivalent of the epoxide resin reactant with the preferred amounts being about 0.005 to about 0.02 mol per epoxide equivalent.

The unhindered amines are secondary amines which have no beta hydroxyl containing hydrocarbon substituents and tertiary amines which have no or only one beta hydroxyl containing hydrocarbon substituent. These amines are more reactive catalysts than the first class described hereinbefore and are used in smaller amounts than the first class. The amounts will be from about 0.0001 to about 0.005 mol per epoxide equivalent of the epoxide resin reactant with the preferred amounts being about 0.0005 to about 0.002 mol per epoxide equivalent.

In carrying out the process of this invention, the temperature should not exceed about 150° C. Temperatures in excess of about 150° C. lead to uncontrollable exothermic reactions and to undesirable side reactions. The reaction rate at temperatures below about 50° C. are slow, requiring undesirably long processing times. The preferred temperatures for this reaction are from about 50° C. to about 150° C. with the most preferred being about 60° C. to about 125° C.

The molecular weight of the higher molecular weight epoxide resins produced by the process of this invention will depend upon the ratio of dihydric phenol to lower molecular weight epoxide resin employed. In order to obtain a higher molecular weight epoxide-containing resin, one equivalent of epoxide resin will be reacted with less than 1 equivalent of dihydric phenol. Numerically expressed, the ratio of reactants used will be one equivalent of epoxide resin to about 0.1 to about 0.9 phenolic hydroxyl equivalents. In the process of this invention, the molecular weight of the second 1,2 epoxide resin (the higher molecular weight product) is increased by a factor of about 0.4 to about 15 over the molecular weight of the first 1.2 epoxide resin (the lower molecular weight reactant).

The reaction of the lower molecular weight epoxide resin and dihydric phenol can be conducted in solvents or in the absence of solvents. Suitable solvents are aromatic hydrocarbons, ketones, ethers, esters and mixtures of such solvents. The epoxide resin, dihydric phenol and catalyst can all be added to the reaction vessel together, the epoxide resin and dihydric phenol can be codissolved before adding the catalyst, or the dihydric phenol can be added incrementally to the epoxide resin and catalyst. The reactants should be stirred until the exothermic reaction is completed, care being exercised to keep the temperature within the limits hereinbefore defined. After the exothermic reaction is over, stirring is not necessary and the reaction of epoxide groups with phenolic groups can be completed at the same temperature as used initially, at a lower temperature or at a higher temperature.

This invention will be explained in more detail in the following examples. Parts, where used, are meant to be parts by weight. The epoxide resin used in these examples is the reaction product of p,p'-dihydroxydiphenyl propane and epichlorohydrin and has an epoxide equivalent weight of 186.8 and a viscosity at 25° C. of 8000 to 10,000 cps.

*Example 1*

To a suitable container equipped with a stirrer, thermometer and external heating source were added 373.6 parts of epoxide resin and 114.1 parts of p,p'-dihydroxydiphenol propane. Heat was applied to the container and when the temperature reached 125° C., and after the system was homogeneous, 1.586 parts of n-butylamine were added. Heating and stirring were continued at 125° C. for one hour. The resulting product had an epoxide equivalent weight of 506, and a Gardner-Holdt viscosity at 25° C. of $A_5$ at 40 percent solids in methylethyl ketone.

In order to check the stability of this product, the stirrer and thermometer were removed from the container and the container was placed in a 125° C. oven. After 54 hours in the oven, the product had an epoxide equivalent weight of 609 and a Gardner-Holdt viscosity at 25° C. of $A_4$ at 40 percent solids in methyl ethyl ketone. After heating for an additional 110 hours at 25° C., the product had not gelled but was still soluble and fusible.

*Example 2*

Using the same procedure as described in Example 1, 373.6 parts of epoxide resin were reacted with 114.1 parts of p,p'-dihydroxydiphenyl propane using 0.185 part of tri-n-butylamine as catalyst. After heating for five hours at 125° C., the resulting higher molecular weight epoxide resin product had an epoxide equivalent weight of 517 and a Gardner-Holdt viscosity at 25° C. of $A_5$ at 40 percent solids in methyl ethyl ketone.

The higher molecular weight epoxide resin product was heated for 35 hours in a 125° C. oven. After this heating period, the epoxide equivalent weight was 547 and the Gardner-Holdt viscosity at 25° C. was $A_5$ to $A_4$ at 40 percent solids in methyl ethyl ketone. After being heated in the oven at 125° C. for a total of 160 hours, the product was not gelled and had an epoxide equivalent weight of 624 and a Gardner-Holdt viscosity at 25° C. of $A_4$ at 40 percent solids in methyl ethyl ketone.

*Example 3*

Using the same procedure as was described in Example 1, 373.6 parts of epoxide resin were reacted with 114.1 parts of p,p'-dihydroxydiphenyl propane using 2.935 parts of triethanol amine as catalyst. After heating for 40 minutes at 125° C., the resulting high molecular weight epoxide resin product had an epoxide equivalent weight of 505 and a Gardner-Holdt viscosity at 25° C. of $A_5$ at 40 percent solids in methyl ethyl ketone. After a total of four hours heating at 125° C., the resulting product had an epoxide equivalent weight of 542. The product was then heated for 105 hours in a 125° C. oven. Gelation did not occur, the product remaining soluble and fusible.

*Example 4*

Using the same procedure as described in Example 1, 386.4 parts of epoxide resin were reacted with 114.1 parts of p,p'-dihydroxydiphenyl propane using 3.83 parts of tri-isopropanol amine as catalyst. After 2 hours reaction at 125° C., the resulting high molecular weight epoxide resin product had an epoxide equivalent weight of 505 and a Gardner-Holdt viscosity at 25° C. of $A_5$ at 40 percent solids in methyl ethyl ketone. After being heated for 126 hours in a 125° C. oven, the product was not gelled and had an epoxide equivalent weight of 719 and a Gardner-Holdt viscosity at 25° C. of $A_3$ at 40 percent solids in methyl ethyl ketone.

*Example 5*

Using the same procedure as described in Example 1, 379.8 parts of epoxide resin were reacted with 114.1 parts of p,p'-dihydroxydiphenyl propane using as a catalyst 7.5 parts of a di-alkanol tertiary amine which was the reaction product of 1 mol of n-butylamine with 2 mols of phenyl glycidyl ether. After heating at 125° C. for 2 hours, the resulting high molecular weight epoxide resin product had an epoxide equivalent weight of 516 and a Gardner-Holdt viscosity at 25° C. of $A_5$ at 40 percent solids in methyl ethyl ketone. The product after being heated for 300 hours in a 125° C. oven had an epoxide equivalent weight of 760 and a Gardner-Holdt viscosity of $A_2$ at 25° C. at 40 percent solids in methyl ethyl ketone.

The higher molecular weight epoxide resins produced by this invention are useful in the production of varnishes, molding resins, adhesives, and the like. They can be cured with any of the well-known conventional epoxy resin curing agents to produce insoluble and infusible products. These epoxy resins have excellent reactivity towards curing agents, thus producing cured resins having excellent tensile and flexural strength properties and excellent adhesion to metals, plastics, wood and the like.

It is to be understood that the foregoing detailed description is given merely by way of illustration and that many variations may be made therein without departing from the spirit of the invention.

The embodiments of the invention in which an exclusive property or privilege is claimed are defined as follows:

1. A process for preparing heat stable epoxide containing compositions which comprises reacting at a temperature of about 50° C. to about 150° C. a first 1,2 epoxide resin with a dihydric phenol in the ratio of one equivalent of epoxide group of the first epoxide resin to less than one equivalent of phenolic hydroxyl of the dihydric phenol in admixture with an amine catalyst having the formula

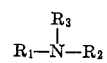

$$R_1 - \underset{\underset{R_3}{|}}{N} - R_2$$

wherein $R_1$ and $R_2$ are selected from the group consisting of hydrogen, hydrocarbon groups containing 1 to 22 carbon atoms having a methylene group adjacent to the nitrogen atom and being free from groups reactive with epoxide groups, and hydrocarbon groups containing 2 to 10 carbon atoms having an ethylene group adjacent to the nitrogen atom and containing a hydroxyl group on the carbon atom beta to the nitrogen atom and being free from other groups reactive with epoxide groups and wherein $R_3$ is selected from the group consisting of hydrocarbon groups containing 1 to 22 carbon atoms having a methylene group adjacent to the nitrogen atom and being free from groups reactive with epoxide groups, and hydrocarbon groups containing 2 to 10 carbon atoms having an ethylene group adjacent to the nitrogen atom and containing a hydroxyl group on the carbon atom beta to the nitrogen atom and being free from other groups reactive with epoxide groups, the ratio of amine catalyst to each epoxide equivalent of the first epoxide resin being about 0.001 to about 0.05 mol of amine having at least two nitrogen atom constituents selected from at least one member of the group consisting of hydrogen and a hydrocarbon substituent having a hydroxyl group on the carbon atom beta to the nitrogen atom and about 0.0001 to about 0.005 mol. of amine having no more than one nitrogen atom substituent selected from the group consisting of hydrogen and a hydrocarbon substituent having a hydroxyl group on the carbon atom beta to the nitrogen atom to form a second 1,2 epoxide resin wherein the molecular weight of said second epoxide resin is increased by a factor of about 0.4 to about 15 over the molecular weight of said first epoxide resin.

2. The process of claim 1 wherein $R_1$, $R_2$ and $R_3$ are the same.

3. The process of claim 1 wherein the first epoxide resin has a molecular weight of about 222 to about 2000.

4. The process of claim 1 wherein the first epoxide resin is a polyglycidyl ether of p,p'-dihydroxydiphenyl propane and the dihydric phenol is p,p'-dihydroxydiphenyl propane.

5. The process of claim 1 wherein the catalyst is n-butylamine.

6. The process of claim 1 wherein the catalyst is triisopropanolamine.

7. The process of claim 1 wherein the catalyst is tri-n-butylamine.

8. The process of claim 1 wherein the first epoxide resin is reacted with the dihydric phenol in the ratio of 1 epoxide equivalent of the epoxide resin to about 0.1 to about 0.9 phenolic hydroxyl equivalents of the dihydric phenol.

9. The process of claim 1 wherein the reactants are heated to a temperature of about 100° C. to about 125° C. until the hydroxyl groups of the dihydric phenol are substantially reacted.

References Cited

UNITED STATES PATENTS 2,945,004  7/1960  Greenlee _____ 260—47

WILLIAM H. SHORT, *Primary Examiner.*

T. D. KERWIN, *Assistant Examiner.*